R. M. NEWBOLD.
SYSTEM FOR THE GENERATION AND DISTRIBUTION OF ELECTRIC CURRENTS.
APPLICATION FILED JULY 9, 1908.
960,683.  Patented June 7, 1910.
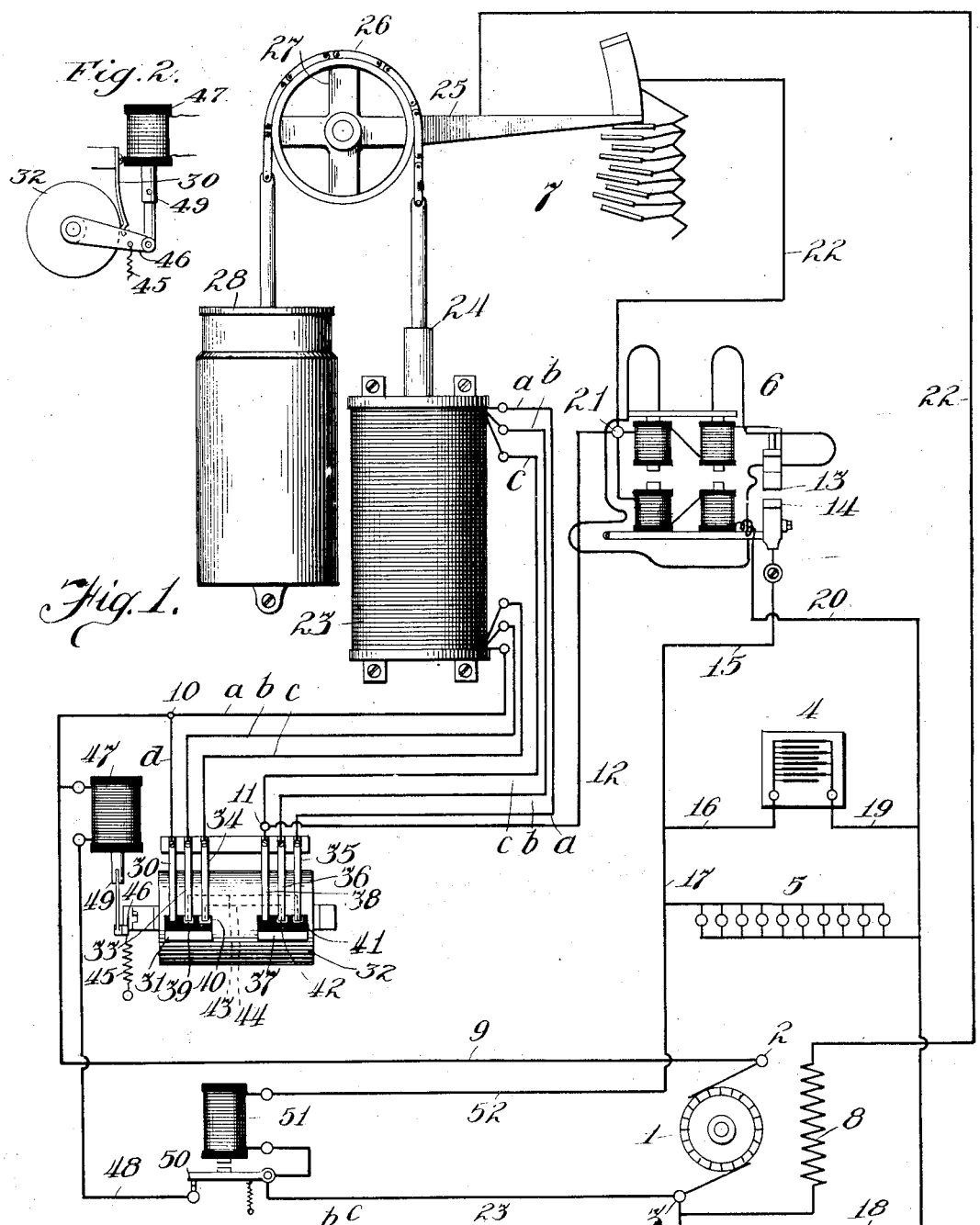
Witnesses
Milton Lenoir
Charles B. Gillson
Inventor
Roger M. Newbold
By Gillson & Gillson
Attorneys

UNITED STATES PATENT OFFICE.

ROGER M. NEWBOLD, OF CHICAGO, ILLINOIS, ASSIGNOR TO THE ADAMS & WESTLAKE COMPANY, A CORPORATION OF ILLINOIS.

SYSTEM FOR THE GENERATION AND DISTRIBUTION OF ELECTRIC CURRENTS.

960,683. Specification of Letters Patent. Patented June 7, 1910.

Application filed July 9, 1908. Serial No. 442,674.

*To all whom it may concern:*

Be it known that I, ROGER M. NEWBOLD, a citizen of the United States of America, and resident of Chicago, county of Cook, and State of Illinois, have invented certain new and useful Improvements in Systems for the Generation and Distribution of Electric Currents, of which the following is a specification, and which are illustrated in the accompanying drawings, forming a part thereof.

The invention relates to electric systems comprising a self-exciting dynamo driven at variable speeds, a storage battery and a work circuit, its object being to provide for the automatic regulation of the dynamo and to prevent overcharging of the battery; and it consists of the parts and arrangement of parts as hereinafter described and as conventionally illustrated in the accompanying drawings, in which—

Figure 1 is a diagrammatic and conventional representation of the system; Fig. 2 is an end view, diagrammatically shown, of one of the switches of the system and showing in elevation the solenoid for controlling the same; and Fig. 3 is a detail diagram showing the arrangement of the branch circuits and switches for varying the regulation.

The dynamo is shown at 1, and its brush terminals at 2, 3.

At 4 there is represented a storage battery, and at 5 a work circuit.

At 6 there is shown a common form of automatic circuit breaker in the main line of the dynamo, and at 7 a regulating rheostat in the circuit of the dynamo field 8.

The main positive lead 9 of the dynamo extends from the terminal 2 to a junction point 10, where it is subdivided into three branch lines $a$, $b$, $c$, which are reunited at the junction point 11. From this point the main line, now designated 12, leads through the terminals 13, 14, of the automatic circuit-breaker 6 and the line 15, connecting with the positive terminal of the battery 4 through the line 16, and with the work circuit 5 through the line 17. The main negative lead 18 of the dynamo leads from the brush terminal 3 to the work circuit, and is connected with the negative terminal of the battery 4 through the line 19.

A shunt 20 for controlling the automatic cut-out 6 leads from the positive main, as shown, at 21, to the negative main, being shown as uniting with the latter at the juncture of lines 18, 19. The field circuit 22 is in shunt from the main dynamo leads, being shown as connected with the positive lead 12 at 21 and passing through the rheostat 7, and being connected with the negative main at any convenient point, as shown at or adjacent to the brush terminal 3.

The three branch lines $a$, $b$, $c$, of the main positive lead are included in the coil of the field-regulating solenoid 23, whose co. actuates the arm 25 of the rheostat 7, bein₅ suspended, by means of a chain 26, over a pulley 27 mounted with this arm, the opposite end of this chain supporting a counterweight 28. As the current output of the dynamo is built up by the increasing speed of the armature, the core 24 is drawn downwardly, increasing the resistance in the field and thereby counteracting the effect of the increased speed, and maintaining a uniform current outflow.

The branch circuit $a$ leads directly from the junction point 10. The branch circuits $b$, $c$, are connected with this junction point through a short branch $d$ leading to a brush 30, which coöperates with a contact-plate 31, carried by an oscillating drum 32, and also coöperating with brushes 33, 34, forming terminals, respectively, of the branches $b$, $c$.

The branch circuit $c$ leads directly to the junction point 11, and the branches $a$, $b$, are connected with this point through brush terminals 35, 36, respectively, coöperating with the contact-plate 37 on the drum 32, which also coöperates with the brush terminal 38 connected directly with the junction point 11.

By the arrangement described the several branch circuits $a$, $b$, $c$, are arranged in parallel, the magnetic effect upon the core 24 being the same as if any one of these branches carried all of the current. That is to say, the effective ampere turns of the solenoid coil, with the current thus subdivided, are reduced in number to one-third of the actual number of turns of wire in the coil.

Provision is made for connecting the branches $a$, $b$, $c$, in series. To this end the drum 32 carries contact plates 39, 40, coöperating, respectively, with the brushes 33, 34, and contact plates 41, 42, coöperating, respectively, with the brushes 35, 36. A connector 43 unites the plates 39 and 41, and a connector 44 unites the plates 40 and 42. When the drum 32 is shifted to engage the contact plates 39 and 40, 41 and 42, with the brushes with which they respectively coöperate, the brushes 30 and 38 are out of service and all of the current passes through the line *a*, connector 43, line *b*, connector 44, and line *c* to the junction point 11. The effective ampere turns of the core 23 now correspond to the actual number of turns of wire therein, and the magnetic action is, therefore, greatly increased. It will thus be seen that when the branches *a*, *b*, *c*, are arranged in parallel, much more current is required to effect the field regulation than when they are arranged in series. In the one instance there is ample current to serve the lamp circuit 5 and charge the battery 4; in the other, the current output is reduced to a minimum for the purpose of preventing the overcharging of the battery.

The drum 32 is automatically controlled. A spring 45, engaging a crank-arm 46 of the drum, normally holds it in the position shown in Fig. 1, the branch circuits being arranged in series. A solenoid 47, in the shunt line 48 of the main dynamo leads, has its core 49 connected to the crank-arm 46 and acts in opposition to the spring 45. So long as the shunt 48 remains closed the drum is immediately shifted, upon the starting of the dynamo, to connect the branch circuits *a*, *b*, *c*, in parallel, and the dynamo continues to generate current at its maximum rate until the battery 4 is fully charged. When this has occurred the battery voltage has become sufficient to open the normally-closed circuit-breaker 50 in the shunt 48, through the medium of a voltage coil 51 in a shunt line 52, whereupon the drum 32 is shifted, by the action of the spring 45, to the position shown in Fig. 1, and the field regulation is established at a new value. In Fig. 1 the parts are shown in the position assumed when the dynamo is at rest.

The series arrangement of the branch circuits *a*, *b*, *c*, is graphically illustrated in Fig. 3, the circuit being indicated by the arrows.

I claim as my invention—

1. In a system for the generation and distribution of electricity, in combination, a self-exciting dynamo, means for regulating the field circuit thereof comprising an electro-magnet in series with the main circuit, the coil of such magnet comprising a plurality of branches, and means for connecting such branches either in series or parallel.

2. In a system for the generation and distribution of electricity, in combination, a self-exciting dynamo, a secondary battery, means for regulating the field circuit thereof comprising an electro-magnet in series with the main circuit, the coil of such magnet comprising a plurality of branches, and means controlled by the voltage of the secondary battery for connecting such branches either in series or parallel.

3. In a system for the generation and distribution of electricity, in combination, a self-exciting dynamo, a secondary battery, means for regulating the field circuit of the dynamo comprising an electro-magnet in series with the main circuit, the coil of such magnet comprising a plurality of branches, a switch arranged to connect such branches in series or parallel, an electro-magnet in shunt from the main line for controlling the switch, and a voltage coil in shunt from the battery for controlling the main line shunt.

4. In a system for the generation and distribution of electricity, in combination, a self-exciting dynamo, means for regulating the field circuit of the dynamo comprising an electro-magnet whose coil comprises a plurality of branches of the main dynamo line, a switch adapted to normally connect such branches in series, an electro-magnet for moving the switch to connect said branches in parallel, and means for deënergizing the last-named magnet.

5. In a system for the generation and distribution of electricity, in combination, a self-exciting dynamo, means for regulating the field circuit of the dynamo comprising an electro-magnet whose coil comprises a plurality of branches of the main dynamo line, a switch adapted to normally connect such branches in series, an electro-magnet in shunt from the main line for moving the switch to connect said branches in parallel, and means for deënergizing the last-named magnet.

6. In a system for the generation and distribution of electricity, in combination, a self-exciting dynamo, a secondary battery, means for regulating the field circuit of the dynamo comprising an electro-magnet whose coil comprises a plurality of branches of the main dynamo line, a switch adapted to normally connect such branches in series, an electro-magnet for moving the switch to connect said branches in parallel, and means for deënergizing the last-named magnet.

7. In a system for the generation and distribution of electricity, in combination, a self-exciting dynamo, a secondary battery, means for regulating the field circuit of the dynamo comprising an electro-magnet whose coil comprises a plurality of branches of the main dynamo line, a switch adapted to normally connect such branches in series, an electro-magnet for moving the switch to connect said branches in parallel, and means controlled by the battery for deënergizing the last-named magnet.

8. In a system for the generation and distribution of electricity, in combination, a self-exciting dynamo, a secondary battery, means for regulating the field circuit of the dynamo comprising an electro-magnet whose coil comprises a plurality of branches of the main dynamo line, a switch adapted to normally connect such branches in series, an electro-magnet for moving the switch to connect said branches in parallel, and a voltage coil in shunt from the battery for opening the circuit of the last-named magnet.

ROGER M. NEWBOLD.

Witnesses:
Louis K. Gillson,
E. M. Klatcher.